Oct. 15, 1957  A. P. CAPITANI  2,809,729
FASTENING MEANS
Filed Oct. 11, 1952

INVENTOR.
ARNOLD P. CAPITANI
BY
ATTORNEY.

United States Patent Office

2,809,729
Patented Oct. 15, 1957

2,809,729

FASTENING MEANS

Arnold P. Capitani, Detroit, Mich.

Application October 11, 1952, Serial No. 314,399

9 Claims. (Cl. 189—88)

This invention relates to fasteners and more particularly to an improved screw molding arrangement for fastening garnish moldings or the like to their supporting structure and a method of attaching such moldings to a surface to be decorated thereby.

In the sheet metal industry it is common practice to secure two metal sheets together by driving a screw through one sheet until the threads on the shank of the screw are tightly engaged in an aperture provided in the second sheet of metal that is fixedly supported in spaced relation to the first sheet. Such a practice is frequently followed when attaching a garnish molding around the window frames in an automobile body, for example, and to complete the mounting of the garnish molding as practiced heretofore, the molding is temporarily held in place while a series of holes are drilled in the second or backing plate so that the screw thread receiving apertures therein will line up with the widely spaced screw holes provided in the garnish molding. This temporary holding operation is usually manually performed during the final assembly operation in order that the screw receiving holes will be properly lined up so that the molding can be neatly fitted around the opening.

The present invention provides an improved method of attaching two sheets together and includes an improvement in the backing plate construction for use where garnish moldings or the like are to be fastened to a structure in the practice of which, the above mentioned temporary holding step may be eliminated. The present invention provides an improved attaching method and structure in which the screw receiving apertures of the backing plate may be punched out prior to the final assembly operation so that screws may be driven home quickly and the assembly can be speeded up with the assurance of a proper alignment between the spaced screw receiving apertures of the two sheets being fastened together.

The preferred manner of illustrating this invention is concerned with its use for attaching garnish moldings to auto bodies and for this purpose the molding or other cooperating element may be provided with a series of screw receiving apertures spaced rather widely apart to receive the series of screws required for holding the molding in place. The spaced backing strip which is adapted to cooperate with the molding to hold it in place on the body structure, is provided with a series of closely spaced screw thread receiving apertures preferably formed in clusters, which clusters are spaced along the backing strip to be centered approximately behind each of the screw receiving apertures formed in the other member. When the backing strip is assembled together with the body structure, with the screw receiving apertures positioned over the clusters, the screws may be quickly lined up with the closest one of the apertures forming the cluster and the screw may be quickly driven home without requiring any special attention with respect to the alignment of the screw receiving apertures.

Preferably the apertures in the backing strip used for attaching the garnish molding to a body are produced therein by piercing or deforming the metal rather than by a punching operation which severs the metal to form the hole. The backing strip is then positioned behind the molding with groups of its closely spaced apertures situated approximately in line with each of the widely spaced screw receiving apertures of the molding or other structural member. Preferably the backing strip is so situated in spaced relation to the molding and is turned so that the deformed material faces away from the head of the screw and, thus, when the screw is driven home, the screw threads tend to draw the deformed metal back into the aperture in the backing strip into which it is driven to more tightly bind the screw in the aperture.

Referring to the drawings for a more detailed description of the preferred form of the invention:

Figure 1:
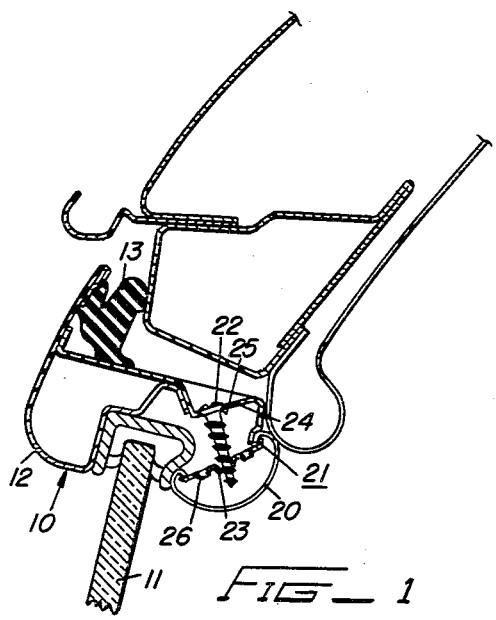
Fig. 1 is a vertical section through a portion of an automobile body such as the top rail of a door thereof.

Referring to Fig. 1, the door structure 10 is of conventional design and includes a window pane 11, the top rail structure 12, and a rubber sealing strip 13 for engaging against the edge of the top of the car. It is usual to dress up the opening surrounding the window on the inside of the door and as shown in Fig. 1, the top rail 12 of the door structure is adapted to have a garnish molding 20 fixed thereto. The garnish molding 20 is provided with a backing strip 21 that is adapted to have threaded engagement with a plurality of screws 22 that may be driven into the apertures 23, and, referring to Fig. 1, the screws 22 are supported in the window frame from the header member 24. The header 24 may be provided with a series of relatively widely spaced screw receiving apertures 25, so that a series of screws may be inserted therein to engage the backing strip 21 at spaced points around the inside periphery of the garnish molding to hold it in place.

In following the teaching of this invention the screw receiving apertures 23 produced in the backing strip 21 are arranged in a cluster pattern and each of said clusters of apertures is spaced along the backing strip to be centered approximately in line with each of the apertures 25 formed in header 24. In the view shown in Fig. 1, the screw 22 has been shown inserted through an aperture 25 and engaged in one of the apertures 23 around the outside of one of the clusters of apertures in the backing strip 21. It is obvious that the screw might have been inserted through the aperture 25 and engaged in any one of the other apertures of the cooperating cluster had it provided a better alignment. In following this teaching it is thus possible to more rapidly assemble a molding such as garnish molding 20 around the window opening by prefabricating both the apertured structural member 24 and the backing strip 21 as here taught.

Preferably the apertures 23 are formed in the backing strip 21 by a metal deforming process wherein the puckered flange 26 is formed, rather than by producing the holes by drilling or stamping them out of the metal sheet.

When such holes are pierced in the strip 21 to produce a flange-like periphery 26 around one side of the hole, the strip may be positioned such that when the screws 22 are driven home, the threads tend to draw the flange 26 or deformed portion of the metal back into the thread receiving hole. When, by the action of the threads, more metal is crowded into engagement therewith within the confines of aperture 23, it is obvious that a much tighter and more secure thread locking action is produced. To accomplish this desirable result, the backing strip must be assembled with respect to the screw head supporting member such that the flange 26, i. e. the deformed metal faces in a direction away from the head of the screw whereby it is pulled back into the aperture 23 by the camming action of the screw thread.

Figure 3:
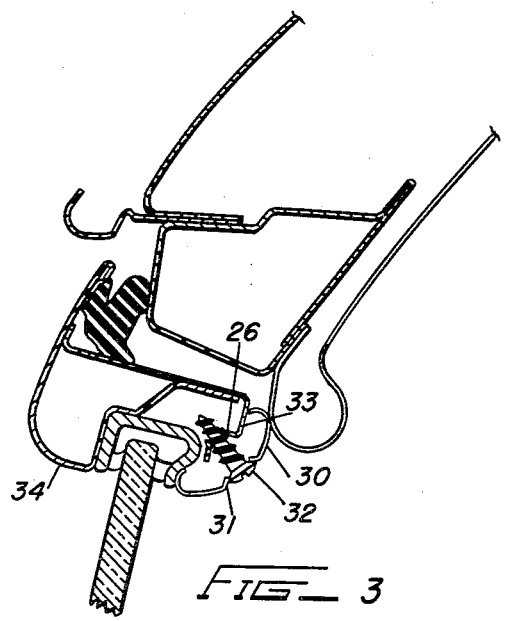
Fig. 3 is a similar vertical section through an automobile door showing a modified form of the invention.
Figure 2:
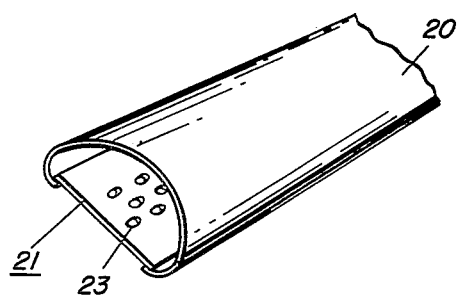
Fig. 2 is a perspective view of the garnish molding structure shown in Fig. 1.
Figure 4:
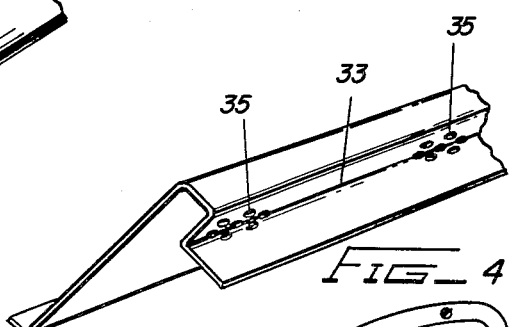
Fig. 4 is a perspective view of the backing strip adapted for cooperation with the garnish molding structure shown in Fig. 3.
Figures 5, 7:
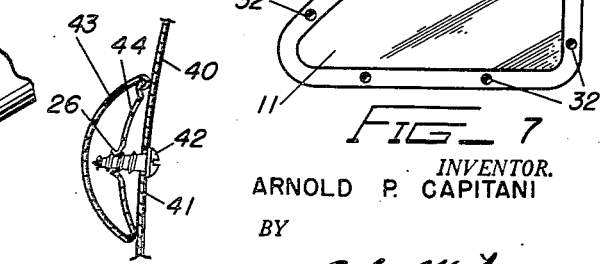
Fig. 5 is a vertical section through a trim molding such as a chrome strip mounted along the side of an automobile body.
Fig. 7 is an inside elevation of a rear quarter panel window of an automobile body.

Referring to Figs. 3 and 4, a modified form of garnish molding and backing strip structure is shown and in this form of the invention the garnish molding 30 may be constructed to have a series of widely spaced apertures 31 therein that are adapted to receive the several screws 32 to hold the molding around the window frame as is conventional. Such a molding is illustrated in the inside elevation of a rear quarter panel window as shown in Fig. 7, and a plurality of screws 32 are shown in place in the widely spaced apertures 31. Referring again to Figs. 3 and 4, the backing strip 33 which is shown more clearly in Fig. 4 is made integral with the header 34 of the window structure. The backing strip may have a plurality of apertures 35 formed therein in a clustered arrangement as is clearly shown in Fig. 4 to receive the threaded end of screw 32. With this construction the backing strip provides a wide tolerance not only in the alignment of apertures 31 and 35, but also makes possible an angular adjustment of the shank of the screw with respect to the molding surface whereby the head of the screw may be made to lie flush with the surface of the molding. Thus if aperture 31 is formed slightly off the crown of the curved molding, the shank of the screw can be directed slightly off center to turn the head of the screw into flush alignment with the surface of the molding. In this instance, the threaded portion of the screw would engage in one of the holes in the outer circle of holes 35 forming the cluster pattern.

As previously stated, it is preferred that the apertures 35 be produced by piercing backing plate 33 so as to deform the metal in the manner shown in exaggerated form in Fig. 3. Thus when screw 32 is driven home, this deformed metal is drawn partially back into the aperture 35 through which the screw passes so as to more tightly engage the screw therein.

In the form of the invention shown in Figs. 3 and 4, the backing strip 33 is provided with a series of the clusters of apertures 35, the clusters being spaced along the backing strip to be centered approximately in line with the series of widely spaced apertures 31 provided in the molding 30. With this structure it is not critically important that any particular aperture 35 line up with the respective aperture 31 with which that cluster cooperates because the apertures in each the clusters are closely grouped so that at least one of the apertures will be approximately in front of the particular aperture 31. As explained above, this arrangement greatly facilitates the final assembly operation.

Figure 6:
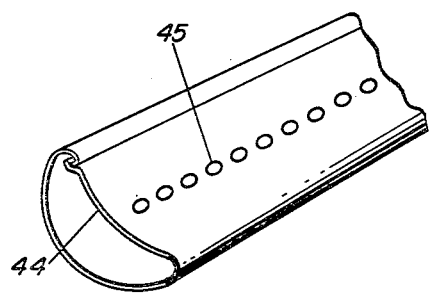
Fig. 6 is a rear perspective view of the molding shown in Fig. 5.

Referring to Figs. 5 and 6, a still further modification of this invention is shown wherein a panel structure 40 may be provided with a relatively widely spaced series of apertures 41 to receive screws 42. In this instance, a trim strip such as a chrome bead 43 may be affixed to panel 40 and for this purpose, the molding strip 43 may be provided with an integral backing strip 44 that is provided with a series of closely spaced apertures 45 which are preferably formed by a piercing operation or the like. In assembling the molding 43 to panel 40, the screws 42 are placed in the widely spaced apertures 41 and as the screws are projected through these apertures, they will engage in one of the closely spaced apertures 45 in the backing strip 44 to hold the molding firmly in place.

In making use of this invention, two cooperating sheet metal pieces are formed so that one sheet has a series of relatively widely spaced apertures therein and the other has a series of very closely spaced apertures produced in it in a position to cooperate with the holes in the other sheet. The closely spaced apertures are preferably grouped so as to correspond approximately with the spacing of the series of apertures in the first piece. When such pieces have been provided, they may be brought into the proper relative spaced position with the series of widely spaced apertures lined up about in front of the groups or clusters or apertures in the other piece. Then a screw may be projected through each of the widely spaced apertures and threadedly engaged in one of the apertures in the closely spaced series of apertures cooperating therewith. In this manner the two metal pieces may be quickly assembled together.

While the invention has been described above in its preferred form in connection with the mounting of trim molding such as garnish or chrome molding on an automobile body structure, it is apparent that its use is not limited thereto. It is apparent that this invention is applicable to the attachment together of two sheets or pieces of metal regardless of where they are to be used, and it is particularly suited to the attachment together of sheet metal parts where economical fastenings are desired, such as in the automotive, household appliance, aviation and other industries wherein sheet metal parts are employed.

Features disclosed but not claimed herein are being claimed in my co-pending application Serial Number 677,291, filed August 9, 1957.

I claim:

1. In a sheet metal construction, a header member contoured transversely to provide a light weight rigid supporting structure having widely spaced apertures therein, a garnish molding contoured transversely to provide a light weight rigid decorative structure, backing member means secured to the garnish molding and providing apertured means having angularly related peripheral guiding means in substantial alignment with the relatively widely spaced apertures in the header member, means carried by the header member to hold the header member and the backing member means in spaced apart relation to provide therebetween an open area of substantial magnitude compared with the thickness of the header member, and fastening screws projecting through the widely spaced apertures in the header member and the open area between the header member and the backing member means engaging the backing member means, the angularly related peripheral guiding means of the backing member means directing the screws towards threaded engagement with the backing member means.

2. In a sheet metal construction, a header member contoured transversely to provide a light weight rigid structure having relatively widely spaced apertures therein, a decorative garnish molding secured to the header member and having backing member means contoured transversely to provide gradually sloping guide portions, the backing member means being apertured substantially at the lowest portion of the sloping guide portions in substantial alignment with the apertures in the header member, means associated with the header member maintaining the apertured portion of the header member and the apertured backing member means in spaced relation to provide an open area therebetween, fastening screws projecting through the apertures in the header member and extending across the open area between said members engaging the backing member means to secure the garnish molding to the header member.

3. In a sheet metal construction, a supporting member contoured to provide a light weight rigid structure having spaced apertures therein, a second member secured to the supporting member and having backing member means contoured transversely to provide gradually sloping guide portions, the backing member means being apertured substantially at the lowest portion of the sloping guide portions in substantial alignment with the apertures in the supporting member, means to hold the apertured portion of the supporting member in spaced relation from the apertured backing member means to provide an open area therebetween, fastening screws projecting through the apertures in the supporting member and extending across the open area between said members engaging the backing member means to secure the second member to the supporting member.

4. In a sheet metal construction, a header member having relatively widely spaced apertures therein, a garnish molding secured to the header member and having backing member means providing sloping screw point guiding surfaces terminating in a plurality of screw point receiving apertures substantially aligned with the relatively widely spaced apertures in the header member, means to hold the backing member means and the header member in spaced apart relation to provide between said members an open space of considerable magnitude compared with the thicknesses of said members, and fastening screws projecting through the apertures in the header member and extending across the open space between said members engaging the screw point receiving apertures in the backing member means to secure the garnish molding to the header member.

5. The combination with a garnish molding having backing member means contoured transversely to provide sloping screw point guiding means terminating in aperture defining means, of a header member having relatively widely spaced apertures therein, means to maintain the backing member means and the header member in spaced apart relation to provide therebetween an open area whereby fastening screws projected through the apertures in the header member extend across said open area and are guided by the sloping screw point guiding means into engagement with the aperture defining means of the backing member means to secure the garnish molding to the header member.

6. In a contoured construction, a supporting member shaped to provide a light weight rigid structure having spaced apertures therein, a second member secured to the supporting member and having backing member means contoured to provide gradually sloping guide portions, the backing member means being apertured substantially at the lowest portion of the sloping guide portions in substantial alignment with the apertures in the supporting member, means positioned at one side of the supporting member to hold the apertured portion of the supporting member and the backing member means in spaced apart relation to provide an open area therebetween, and fastening means projecting through the apertures in the supporting member and extending across the open area between said members engaging the apertured backing member to secure the second member to the supporting member.

7. In a contoured construction, a supporting member shaped to provide a light weight rigid structure having spaced apertures therein, a second member secured to the supporting member and having backing member means contoured to provide gradually sloping guide portions, the backing member means being apertured substantially at the lowest portion of the sloping guide portions in substantial alignment with the apertures in the supporting member, means carried by the supporting member for holding one side of the backing member means in spaced apart relation with respect to the supporting member, means for holding the other side of the backing member means in spaced apart relation with respect to the supporting member to provide an open area therebetween, and fastening means projecting through the apertures in the supporting member and extending across the open area between said members engaging the apertured backing member to secure the second member to the supporting member.

8. In a sheet metal construction, a header member contoured to provide a light weight supporting structure having widely spaced apertures therein, a decorative molding, backing member means secured to the molding and providing apertured means having angularly related peripheral guiding means in substantial alignment with the relatively widely spaced apertures in the header member, means carried by the header member for supporting the molding and backing member means in spaced apart relation relative to the header member to provide therebetween an open area, and fastening screws projecting through the widely spaced apertures in the header member and the open area between the header member and the backing member means engaging the backing member means, the angularly related peripheral guiding means of the apertured backing member means directing the screws towards threaded engagement with the apertured backing member means.

9. In a contoured construction, a supporting member having relatively widely spaced apertures therein, a second member secured to the supporting member and having backing means providing a plurality of screw point receiving apertures substantially aligned with the relatively widely spaced apertures in the supporting member, means to hold the backing member means and the supporting member in spaced apart relation whereby an open space is provided therebetween, fastening screws projecting through the apertures in the supporting member and extending across the open space between said members engaging the screw point receiving apertures in the backing member means to secure the second member to the supporting member.

References Cited in the file of this patent
UNITED STATES PATENTS

| | | |
|---|---|---|
| 977,710 | Craig | Dec. 6, 1910 |
| 1,980,023 | Widman | Nov. 6, 1934 |
| 2,101,001 | Balduf | Nov. 30, 1937 |
| 2,213,010 | MacPherson | Aug. 27, 1940 |
| 2,220,826 | Place | Nov. 5, 1940 |
| 2,706,315 | Price | Apr. 19, 1955 |
| 2,733,096 | Waterhouse et al. | Jan. 31, 1956 |